(12) United States Patent
Chan et al.

(10) Patent No.: US 6,787,092 B2
(45) Date of Patent: Sep. 7, 2004

(54) PIPE EXTRUSION DIE FOR MULTI-LAYER PIPE

(76) Inventors: Harry Chan, 207 Boake Trail, Richmond Hill, Ontario (CA), L4B 3Z6; Elio Moy, 99 Franmore Circle, Thornhill, Ontario (CA), L4J 3B9

(*) Notice: Subject to any disclaimer, the term of this patent is extended or adjusted under 35 U.S.C. 154(b) by 495 days.

(21) Appl. No.: 09/827,310

(22) Filed: Apr. 6, 2001

(65) Prior Publication Data

US 2002/0168437 A1 Nov. 14, 2002

(51) Int. Cl.[7] .............................................. B29C 47/06
(52) U.S. Cl. .................... 264/511; 264/512; 264/209.7; 264/209.8; 425/133.1; 425/191; 425/378.1; 425/381; 425/382.3; 425/388; 425/144; 425/460; 425/466
(58) Field of Search .............................. 425/133.1, 191, 425/378.1, 381, 381.2, 380, 460, 466, 388, 382.3, 143, 144, DIG. 60; 264/209.7, 171.27, 209.8, 511, 512

(56) References Cited

U.S. PATENT DOCUMENTS

| | | | |
|---|---|---|---|
| 3,677,676 A | 7/1972 | Hegler | 425/109 |
| 4,510,013 A | 4/1985 | Lupke et al. | 156/498 |
| 4,770,618 A | 9/1988 | Lupke | 425/72.1 |
| 4,789,327 A | 12/1988 | Chan et al. | 425/133.1 |
| 4,808,098 A | 2/1989 | Chan et al. | 425/72.1 |
| 5,186,878 A * | 2/1993 | Lupke | 264/209.4 |
| 5,346,384 A | 9/1994 | Hegler et al. | 425/381 |
| 5,466,402 A | 11/1995 | Lupke | 264/39 |
| 5,511,964 A | 4/1996 | Hegler et al. | 425/326.1 |
| 5,576,032 A | 11/1996 | Lupke | 425/186 |
| 5,976,298 A | 11/1999 | Hegler et al. | 156/244.14 |

* cited by examiner

*Primary Examiner*—Robert Davis
*Assistant Examiner*—Joseph S. Del Sole
(74) *Attorney, Agent, or Firm*—Dimock Stratton LLP; Adrian M. Kaplan

(57) ABSTRACT

There is provided a pipe extrusion die that includes a first and second die assembly. The first and second die assembly each include an extrusion head, a nozzle carrying an outer die lip, a hollow mandrel, an inner mandrel carrying an inner die lip, and a layer-forming channel. The layer-forming channel is defined by the space between the nozzle and inner mandrel. The extrusion die includes a space between the nozzle of the second die assembly and the inner mandrel of the first die assembly such that the first and second die assembly do not share a common wall. The space between the inner and outer die lip (die gap) can be individually adjusted and the second die assembly is freely movable relative to the first die assembly. The extrusion die also includes a vacuum cooling mandrel with a single cooling channel and multiple vacuum ports that provide improved vacuum control over the final die product.

51 Claims, 4 Drawing Sheets

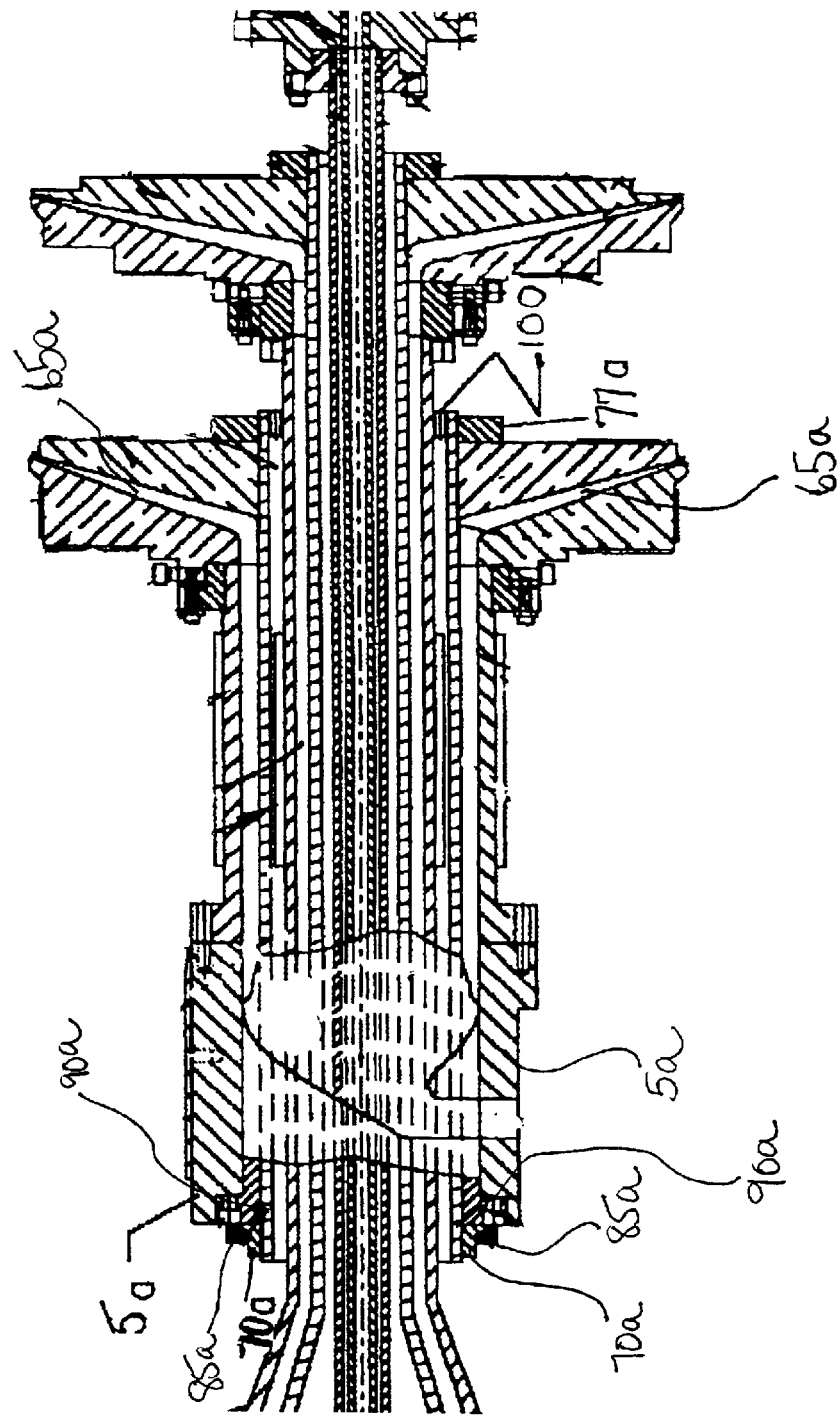

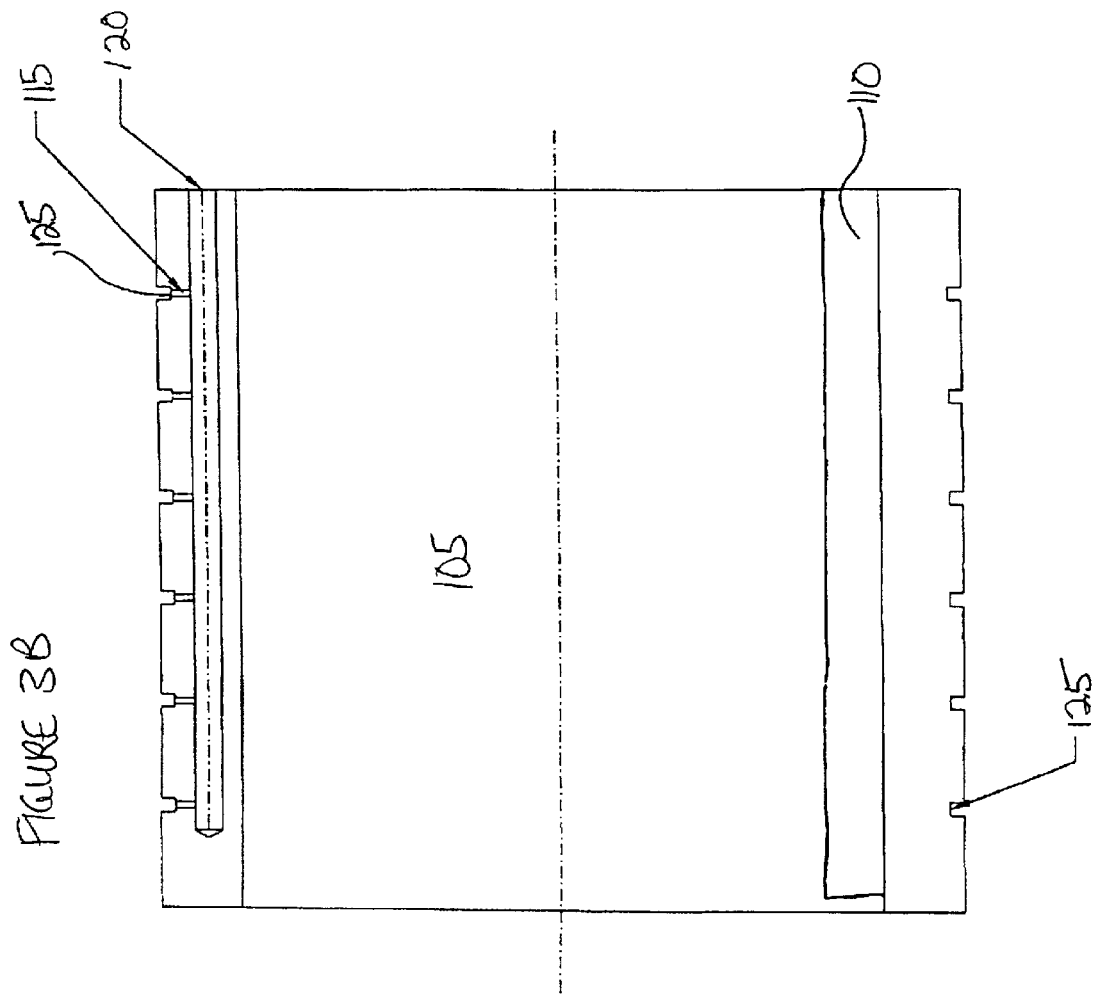

PIPE EXTRUSION DIE FOR MULTI-LAYER PIPE

FIELD OF THE INVENTION

The present invention relates to the field of pipe extrusion dies, and in particular, to a pipe extrusion die that can be used to form a pipe with multiple layers of varying thickness and temperature profiles.

BACKGROUND OF THE INVENTION

The ability to provide an extrusion die that allows for the efficient manufacture of a pipe with multiple seamless layers has been a constant goal of extrusion die manufacturers.

U.S. Pat. No. 5,346,384 to Hegler and U.S. Pat. No. 4,789,327 to Chan provide two examples of extrusion dies used to produce a double-walled thermoplastic pipe. U.S. Pat. No. 4,789,327 to Chan discloses the general structure of the extrusion die, which includes i) an extrusion head having a central bore and a lateral opening for receiving an extrudate; (ii) a nozzle operably connected to the extrusion head, (iii) two hollow mandrels carrying die lips, (iv) two layer-forming channels; and, (v) a cooling mandrel. The layer-forming channels have an entrance passageway that derives from the extrusion head and a discharge end formed by the die gap created by the outer and inner die lip.

More particularly, U.S. Pat. No. 4,789,327 to Chan uses two hollow mandrels, one placed inside the other. The space between the nozzle and the hollow mandrel of the first die assembly comprises the first layer-forming channel and the space between the hollow mandrel of the first die assembly and the hollow mandrel of the second die assembly comprises the second layer-forming channel. Adjustment of the die gap occurs by threaded die lip adjusters. Accordingly, the outer nozzle has to be moved longitudinally in order to adjust the die gap.

The hollow mandrel of the first die assembly is held inside the hollow mandrel of the second die assembly by a spider. The use of a spider to hold the mandrels, one inside the other, results in several disadvantages. In particular, marks appear on the finished pipe, there is an increase in back pressure due to a reduced flow of plastic through the spider legs, heat is lost through the spider section, and leakage occurs at the spider junctions.

U.S. Pat. No. 4,808,098 to Chan provides an extrusion die with the same features as U.S. Pat. No. 4,789,327, but further includes a vacuum cooling mandrel that uses multiple communicating cooling channels along with a few vacuum ports. Distribution of the cooling vacuum therefore occurs, only at a few selected sites, i.e., the location of the vacuum ports.

None of the prior art references, therefore, provide for a pipe extrusion die capable of forming a pipe with more than two layers made from different materials, with varied thickness and temperature profiles.

SUMMARY OF THE INVENTION

In one aspect of the present invention, the disadvantages of the prior art are overcome by providing a pipe extrusion die having a space separating the layer-forming channels. The structure of the pipe extrusion die with this space allows for pipes of more than two layers to be formed that may consist of different materials having different temperature profiles. Having a space between the layer-forming channels allows the added advantage that the individual die assemblies can be moved longitudinally prior to and during manufacture.

In another aspect of the present invention, there is also provided an extrusion die that allows for adjustment of the die lips from a location near the extrusion head. Adjustment of the die lips at a location near the extrusion head allows for adjustment of individual die layers and for die layers to be modified during manufacture of the pipe.

In a further aspect of the present invention, there is provided an improved vacuum cooling mandrel that uses a single cooling channel with multiple vacuum ports to provide more control over the structure and appearance of the pipe that is formed.

According to one aspect of the invention, therefore, there is provided an extrusion die for use in an apparatus to produce multi-layered pipes, the extrusion die comprising: (a) a first and second die assembly, each die assembly comprising: (i) an extrusion head having a central bore and a lateral opening for receiving an extrudate; (ii) a nozzle, operably connected to the extrusion head, the nozzle having an outer die lip at a free end of the nozzle; (iii) a hollow mandrel coaxially located in the central bore, (iv) an inner mandrel coaxially located in the hollow mandrel and in the nozzle, the inner mandrel having an inner die lip at a free end of the inner mandrel; the inner die lip and outer die lip defining a die gap; and, (v) the nozzle and inner mandrel defining a layer-forming channel in fluid communication with the lateral opening and the die gap; wherein a central portion of the nozzle of the second die assembly is co-axially located within the inner mandrel of the first die assembly such that the nozzle of the second die assembly and the inner mandrel of the first die assembly define an air space.

According to another aspect of the invention, there is provided an extrusion die for use in an apparatus to produce multi-layered pipes, the extrusion die comprising: (a) a first and second die assembly, each die assembly comprising: (i) an extrusion head having a central bore and a lateral opening for receiving an extrudate; (ii) a nozzle operably connected to the extrusion head, the nozzle having an outer die lip at a free end of the nozzle; (iii) a hollow mandrel coaxially located in the central bore; (iv) an inner mandrel coaxially located in the hollow mandrel and in the nozzle, the inner mandrel having an inner die lip at a free end of the inner mandrel; the inner and outer die lips defining a die gap; and, (v) the nozzle and inner mandrel defining a layer-forming channel in fluid communication with the lateral opening and the die gap; wherein a central portion of the nozzle of the second die assembly is co-axially located within the inner mandrel of the first die assembly.

According to yet another aspect of the invention, there is provided a vacuum cooling mandrel for an extrusion die, said vacuum cooling mandrel comprising a single cooling channel and multiple vacuum ports, said multiple vacuum ports disposed along an outer surface of the cooling mandrel.

According to yet another aspect of the invention, there is provided a method for preparing a multi-layered pipe using the extrusion die, wherein said method includes the steps of: (a) introducing under pressure, a first extrudate into the lateral opening of the first die assembly and introducing a second extrudate into the lateral opening of the second die assembly; (b) passing said first and second extrudates through said first and second layer-forming channels; and, (c) receiving said first extrudate from the die gap of the first die assembly and receiving the second extrudate from the die gap of the second die assembly.

In another aspect of the invention, the method further includes the step of adjusting the longitudinal distance between the die gap of the first die assembly and the die gap of the second die assembly by moving the second die assembly longitudinally within the inner mandrel of the first die assembly. The method may also include the steps of introducing air pressure into the air space; altering the size of the die gap by using means near the extrusion head for moving the inner die lip longitudinally; shaping the pipe using the vacuum cooling mandrel; and, introducing a vacuum through the vacuum port holes.

Various other advantages will be apparent to the person skilled in the art from the following description of the present invention when read in conjunction with the accompanying drawings.

BRIEF DESCRIPTION OF THE DRAWINGS

In drawings which illustrate by way of example only a preferred embodiment of the invention.

FIG. 2 is a cross-sectional view of the die gap and die gaps adjusters of the embodiment of FIG. 1;

FIGS. 3A and 3B are cross-sectional views of the vacuum cooling mandrel of the embodiment of FIG. 1.

DETAILED DESCRIPTION OF THE PREFERRED EMBODIMENTS

Figure 1:
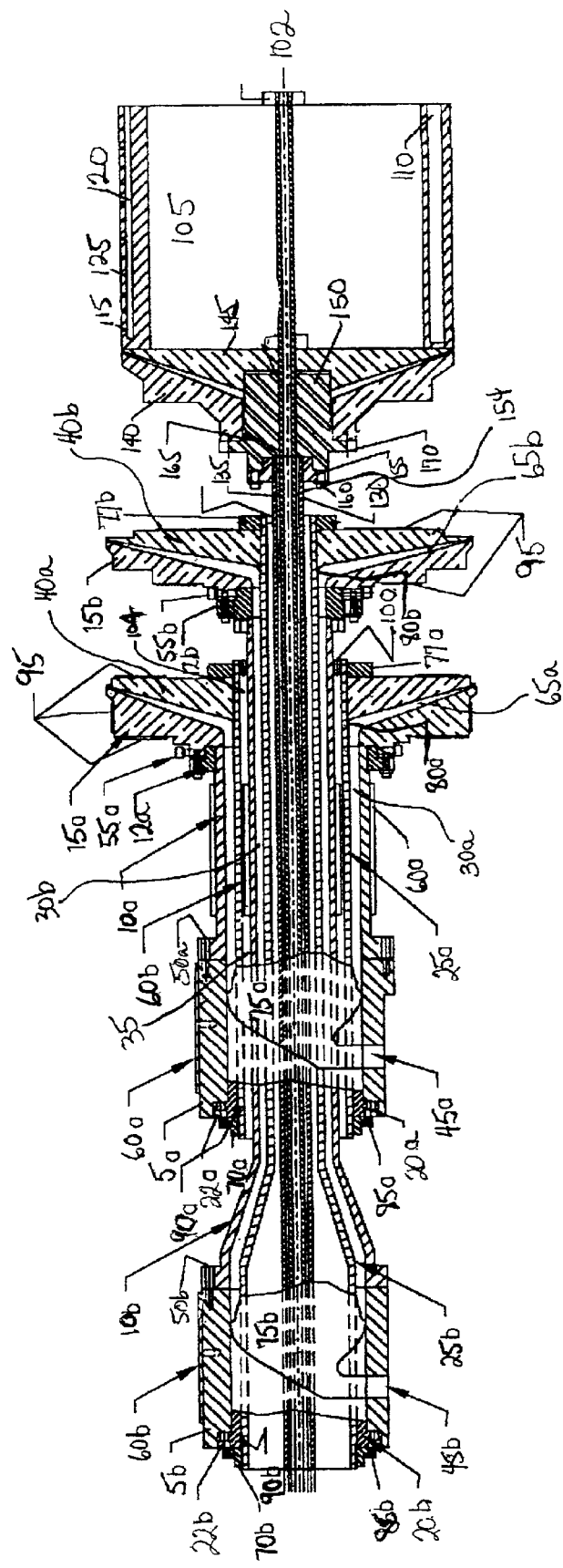
FIG. 1 is a cross-sectional view of one embodiment of the pipe extrusion die of the present invention.

Referring to FIG. 1, a pipe extrusion die is shown in cross-section that includes a first and second die assembly, comprising a first and second extrusion head 5a, 5b, nozzles 10a, 10b, outer die lips 15a, 15b, a first and second hollow mandrel 20a, 20b, a first and second inner mandrel 25a, 25b, inner die lips 40a, 40b, die gap adjusters 70a, 70b, a first and second layer-forming channel 30a, 30b, space 35, and a cooling mandrel 105.

Extrusion heads 5a and 5b each have a central bore with lateral openings 45a, 45b through which extrudate can enter into the die delivery system. The first extrusion head 5a and the first lateral opening 45a define the entrance for the first extrudate. The first extrudate forms the outer layer of the pipe. The second extrusion head 5b and the second lateral opening 45b define the entrance for the second extrudate. The second extrudate forms the inner layer of the pipe. The total number of layers of pipe may be increased by adding additional extrusion heads to the die delivery system.

Extrusion heads 5a, 5b and nozzles 10a, 10b are surrounded by electrical heaters 60a, 60b and thermal sensors (not shown). Electrical heaters 60a, 60b and thermal sensors, ensure that the extrudates are kept at an appropriate temperature as they pass through the die assembly.

Nozzles 10a, 10b are in the form of outer elongated mandrels that extend laterally from extrusion heads 5a, 5b. The upstream ends of nozzles 10a, 10b are connected to extrusion heads 5a, 5b by nut and bolt attachments 50a, 50b. The second, or free ends of nozzles 10a, 10b have mounting flanges 12a, 12b connected to outer die lips 15a, 15b. The location of outer die lips 15a, 15b can be adjusted axially relative to nozzles 10a, 10b by axially mounted screws 55a, 55b. Axially mounted screws 55a, 55b are disposed on the lateral surface of mounting flanges 12a, 12b. Outer die lips 15a, 15b are otherwise fixed to nozzles 10a, 10b and cannot be longitudinally adjusted.

The first and second hollow mandrels 20a, 20b are connected to extrusion heads 5a, 5b by nut and bolt attachments 22a, 22b, arranged along the circumference of extrusion heads 5a, 5b. The first and second hollow mandrels 20a, 20b are located in the central bores of the extrusion heads 5a, 5b, in a substantially coaxial direction. The lateral surfaces of the first and second hollow mandrels 20a, 20b have curved slots 75a, 75b, tangential to lateral openings 45a, 45b. Curved slots 75a, 75b provide gradual channels for entry of the first and second extrudates into the first and second layer-forming channels 30a, 30b.

The first and second inner mandrels 25a, 25b fit snugly within the first and second hollow mandrels 20a, 20b, in an alignment that defines the first and second layer-forming channels 30a, 30b. First and second inner mandrels 25a, 25b provide discharge ends that abut flanges 77a, 77b, forming inner die lips 40a, 40b. Inner die lips 40a, 40b are connected to the first and second inner mandrels 25a, 25b by nut and screw attachments (not shown).

Heaters 95 and thermal sensors (not shown) are disposed on the exposed surfaces of outer die lips 15a, 15b and inner die lips 40a, 40b to help maintain the extrudates at the appropriate temperature.

First and second inner mandrels 25a, 25b have upstream ends that abut the first and second hollow mandrels 20a, 20b. Upstream ends of the first and second inner mandrels 25a, 25b include threads for die gap adjusters 70a, 70b. Die gap adjusters 70a, 70b are nuts that retain the upstream ends of first and second inner mandrels 25a, 25b onto hollow mandrels 20a, 20b, with the assistance of retaining rings 85a, 85b, bolted to the first and second hollow mandrels 20a, 20b.

The discharge ends of the first and second inner mandrels 25a, 25b include spacer rings 80a, 80b that extend beyond the inner curvature of outer die lips 15a, 15b. Spacer rings 80a, 80b prevent inner die lips 40a, 40b from contacting outer die lips 15a, 15b. Spacer rings 80a, 80b define die gaps 65a, 65b, between inner die lips 40a, 40b and outer die lips 15a, 15b.

The size of die gaps 65a, 65b can be adjusted perpendicular to the axis of the die and without the need to move the complete die assembly. The sizes of die gaps 65a, 65b are adjusted using die gap adjusters 70a, 70b (FIG. 2). Die gap adjusters 70a, 70b allow for longitudinal adjustments of inner die lips 40a, 40b relative to outer die lips 15a, 15b. Die gap adjusters 70a, 70b allow a user to vary the thickness of each of the layers of pipe by adjusting the sizes of die gaps 65a, 65b. Keyways 90a, 90b prevent the first and second inner mandrels 25a, 25b from rotating about their axis when die gap adjusters 70a, 70b are turned.

As die gap adjusters 70a, 70b are located at the upstream ends of the die assemblies, away from die lips 15a, 15b, 40a, 40b, the size of die gaps 65a, 65b can be varied during the manufacturing process, thereby causing less disruption to the functioning of the die assemblies. The number of die gap adjusters 70a, 70b correlates with the number of layers in the pipe, thereby allowing for adjustment of individual layers within the pipe. As the die gap of each layer of pipe can be adjusted independently, a user has more control over the finished pipe.

The upstream location of die gap adjusters 70a, 70b also ensures that the size of die gaps 65a, 65b is consistent along the whole circumference of outer die lips 15a, 15b and inner die lips 40a, 40b.

In a further aspect, the pipe extrusion die of the present invention provides the advantage of allowing for the formation of a pipe of multiple layers, in which the layers may comprise extrudate having different temperature profiles. This advantage is achieved by the use of space 35 between the first and second layer-forming channels 30a, 30b.

More specifically, the first and second layer-forming channels 30a, 30b provide distinct passageways for extrudate. The first layer-forming channel 30a provides a longitudinal passageway for the passage of the first extrudate from the extrusion head 5a to the die gap 65a. The second layer-forming channel 30b provides a longitudinal passageway for the passage of the second extrudate from the second extrusion head 5b to the die gap 65b. The second layer-forming channel 30b fits within the bore of the first inner mandrel 25a and is spaced from the first layer-forming channel 30a by the space 35. The width of the space 35 defines the distance between layer-forming channels 30a, 30b.

In this aspect of the present invention, the first and second layer-forming channels 30a, 30b do not share a common wall. As such, the first and second layer-forming channels 30a, 30b can have independent temperature profiles. This provides the advantage that different materials can be used to make the different layers of the pipe. For example, the outer layer of the pipe could be formed of high-density polyethylene (HDPE), while an inner layer could be formed from high temperature silicone.

The space 35 also allows the second die assembly to be moved relative to the first die assembly. In particular, the second die assembly can be moved longitudinally within the inner mandrel of the first die assembly, thereby altering the longitudinal distance between the die gap of the first die assembly and the die gap of the second die assembly.

In order to maintain the first layer-forming channel 30a coaxially with the second layer-forming channel 30b, a spacer 100 is used between the first inner mandrel 25a and the nozzle of the second die assembly 10b. Spacer 100 provides added support to the die assemblies.

The use of spacer 100 to separate the die assemblies, allows spacer 100 to be used to control the air pressure between the die assemblies. In particular, spacer 100 includes holes that facilitate the passage of an air supply line through the die assemblies. The air supply line provides positive air pressure through spacer 100 to the space 104 separating the two consecutive sets of die lips 15a, 40a, and 15b, 40b. A return air line can also be provided to control the air pressure in the space 102. This is useful when forming a pipe with a corrugated outer wall.

It will be apparent to the person skilled in the art that spacer 100 may be of any size or may be made adjustable to accommodate changes in die gaps 65a, 65b.

It will also be apparent to the person skilled in the art that more than two layer-forming channels can be used. However, in cases where the last inner mandrel is too small for the next die assembly to pass through it, an alternative die assembly may be used. This alternative assembly would include a nozzle 130, inner mandrel 135, outer die lip 140, inner die lip 145 and spiral body 150. The nozzle 130 and inner mandrel 135 form a channel 154 used to convey the extrudate.

The spiral body 150 is attached to the nozzle 130 by a flange 155 using bolts 160. The spiral body 150 includes spiralling channels 165 on its outer surface which allow for flow of the extrudate. The depth of spiralling channels 165 decreases in the downstream direction.

The outer die lip 140 is connected to the spiral body 150 by bolts 170 along the circumference. The inner die lip 145 rests on a step machined on the spiral body 150. A die gap spacer (not shown) maintains the outer die lip 140 and inner die lip 145 apart at a defined distance.

Figure 3A:
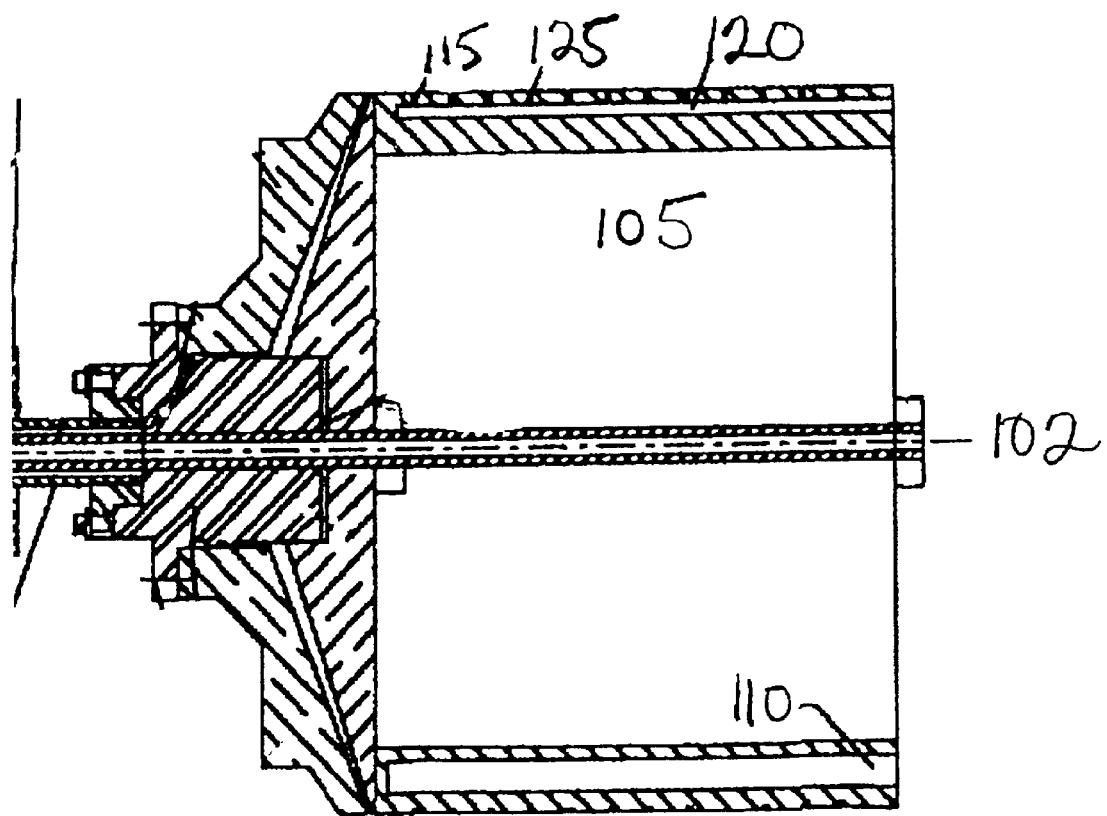

Another aspect of the present invention also provides an improved cooling and vacuum system for the formed pipe. As seen more clearly in FIGS. 3A and 3B, a hollow cooling mandrel 105 is connected to the last layer-forming channel and serves to draw heat from the formed pipe. The cooling mandrel 105 is connected to the last layer-forming channel by threaded nut attachment 102.

The cooling mandrel 105 has a channel 110 through which cooling water can circulate. The channel 110 is a single continuous channel that extends circumferentially around the cooling mandrel 105. Along the outside surface of the cooling mandrel 105, multiple individual vacuum ports holes 115 are disposed in a direction perpendicular to the direction of flow of the cooling mandrel 105 and the direction of flow of the formed pipe. The vacuum ports holes 115 are connected directly to a vacuum source 120 and are arranged along the general length of the cooling mandrel 105 in spaced apart intervals.

At the outside edge of each vacuum port hole 115 is a vacuum groove 125. Each vacuum groove 125 allows for adjustment of the pressure in the adjacent vacuum port 115. The vacuum ports 115 are therefore not in communication with one another, thereby allowing for independent control of the vacuum pressure in each individual vacuum port 115 and, accordingly, along the circumference of the cooling mandrel 105. Such control is important for obtaining a smooth inner pipe wall. To improve the texture of the inner pipe wall further, a light source (not shown) can also be located at the end of the cooling mandrel 105 to assist the user in identifying any imperfections.

In use, therefore, a pipe is formed by extrudates of expandable thermoplastic materials. Extrudates are fed into lateral openings 45a, 45b under pressure and flow through the first and second layer-forming channels 30a, 30b. The extrudates exit through die gaps 65a, 65b. Pressurized air is introduced in space 102 through spacers 100 and force the extrudates outward against a blow mold cavity (not shown). Where a smooth inner wall is desired, the cooling mandrel 105 and vacuum system is used so that the extrudate that exits from die gap 65b is shaped by the cooling mandrel 105. The cooling mandrel 105 and vacuum system extract heat from the extrudate to help cool the formed pipe.

It will be apparent to the person skilled in the art that the structure of the extrusion die of the present invention has the added advantage of being easy to assemble and disassemble, therefore providing for easy replacement or adjustment of parts.

It will be further apparent to the person skilled in the art that the multi-layer design of the pipe extrusion die allows greater flexibility as to the kind of pipe that can be manufactured and the variability in the materials constituting the pipe layers.

Numerous other variations, examples and modifications will also be apparent to a person skilled in the art and should be considered as included in the invention where all such variations, examples and modifications fall within the scope of the appended claims.

We claim:

1. An extrusion die for use in an apparatus to produce multi-layered pipes, the extrusion die comprising:
   (a) a first and second die assembly, each die assembly comprising:
      (i) an extrusion head having a central bore a lateral opening for receiving an extrudate;
      (ii) a nozzle, operably connected to the extrusion head, the nozzle having an outer die lip at a free end of the nozzle;
      (iii) a hollow mandrel coaxially located in the central bore.

(iv) an inner mandrel coaxially located in hollow mandrel and in the nozzle, the inner mandrel having an inner die lip at a free end of the inner mandrel; the inner die lip and outer die lip defining a die gap; and (v) the nozzle and inner mandrel defining a layer-forming channel in fluid communication with the lateral opening and the die gap;

wherein a central portion of the nozzle of the second die assembly is co-axially located within the inner mandrel of the first die assembly such that the nozzle of the second die assembly and the inner mandrel of the first die assembly define an air space.

2. The extrusion die of claim 1, further comprising means for moving the second die assembly longitudinally within the inner mandrel of the first die assembly, thereby altering a longitudinal distance between the die gap of the first die assembly and the die gap of the second die assembly.

3. The extrusion die of claim 1, further comprising means near the extrusion head for moving the inner die lip longitudinally, thereby altering the size of the die gap.

4. The extrusion die of claim 1, further comprising a spacer located in the air space.

5. The extrusion die of claim 4, wherein the spacer comprises openings through which air can be introduced.

6. The extrusion die of claim 1, further comprising a spiral disposal in a location downstream of the first and second die assembly.

7. The extrusion die of claim 1, wherein extrusion head, nozzle, outer die lip and inner die lip of each of said first and second die assemblies include electrical heaters and thermal sensors.

8. The extrusion die of claim 1, further comprising a third die assembly as defined in (a), wherein a central portion of the nozzle of the third die assembly is co-axially located within the inner mandrel of the second die assembly, such that the nozzle of the third die assembly and the inner mandrel of the second die assembly define a second air space.

9. The extrusion die of claim 1, further comprising a vacuum cooling mandrel disposed in a location downstream from said first and second die assemblies, said vacuum cooling mandrel comprising a single cooling channel and multiple vacuum ports, said multiple vacuum ports disposed along an outer surface of the cooling mandrel.

10. The extrusion die of claim 9, wherein said vacuum ports further comprise vacuum port holes for independent regulation of vacuum pressure within each vacuum port.

11. The extrusion die of claim 2, further comprising means near the extrusion head for moving the inner die lip longitudinally, thereby altering the size of the die gap.

12. The extrusion die of claim 2, further comprising a spacer located in the air space.

13. The extrusion die of claim 12, wherein the space comprises openings through which air can be introduced.

14. The extrusion die of claim 2, further comprising a spiral disposed in a location downstream of the first and second die assembly.

15. The extrusion die of claim 2, wherein extrusion head, nozzle, outer die lip and inner die lip of each of said first and second die assemblies include electrical heaters and thermal sensors.

16. The extrusion die of claim 2, further comprising a third die assembly as defined in (a), wherein a central portion of the nozzle of the third die assembly is co-axially located within the inner mandrel of the second die assembly, such that the nozzle of the third die assembly and the inner mandrel of the second die assembly define a second air space.

17. The extrusion die of claim 2, further comprising a vacuum cooling mandrel disposed in a location downstream from said first and second die assemblies, said vacuum cooling mandrel comprising a single cooling channel and multiple vacuum ports, said multiple vacuum ports disposed along an outer surface of the cooling mandrel.

18. The extrusion die of claim 17, wherein said vacuum ports further comprise vacuum port holes for independent regulation of vacuum pressure within each vacuum port.

19. The extrusion die of claim 3, further comprising a spacer located in the air space.

20. The extrusion die of claim 19, wherein the spacer comprises openings through which air can be introduced.

21. The extrusion die of claim 3, further comprising a spiral disposed in a location downstream of the first and second die assembly.

22. The extrusion of claim 3, wherein the extrusion head, nozzle, outer die lip and inner die lip of each of said first and second die assembly include electrical heaters and thermal sensors.

23. The extrusion die of claim 3, further comprising a third die assembly as defined in (a), wherein a central portion of the nozzle of the third die assembly is co-axially located within the inner mandrel of the second die assembly, such that the nozzle of the third die assembly and the inner mandrel of the second die assembly define a second air space.

24. The extrusion die of claim 3, further comprising a vacuum cooling mandrel disposed in a location downstream from said first and second die assemblies, said vacuum cooling mandrel comprising a single cooling channel and multiple vacuum ports, said multiple vacuum ports disposed along an outer surface of the cooling mandrel.

25. The extrusion die of claim 24, wherein said vacuum ports further comprise vacuum port holes for independent regulation of vacuum pressure within each vacuum port.

26. An extrusion die for use in an apparatus to produce multi-layered pipes, the extrusion die comprising:

(a) a first and second die assembly, each die assembly comprising:

(i) an extrusion head having a central bore and a lateral opening for receiving an extrudate;

(ii) a nozzle operably connected to the extrusion head, the nozzle having an outer die lip at a free end of the nozzle;

(iii) a hollow mandrel coaxially located in the central bore, (iv) an inner mandrel coaxially located in the hollow mandrel and in the nozzle, the inner mandrel having an inner die lip at a free end of the inner mandrel; the inner and outer die lips defining a die gap; and (v) the nozzle and inner mandrel defining a layer-forming channel in fluid communication with the lateral opening and the die gap;

wherein a central portion of the nozzle of the second die assembly is co-axially located within the inner mandrel of the first die assembly.

27. The extrusion die of claim 26, further comprising means near the extrusion head for moving the inner die lip longitudinally, thereby altering the size of the die gap.

28. The extrusion die of claim 26, further comprising a spiral disposed in a direction downstream of the first and second die assembly.

29. The extrusion die of claim 26, wherein the extrusion head, nozzle, outer die lip and inner die lip of each of said first and second die assembly include electrical heaters and thermal sensors.

30. The extrusion die of claim 26, wherein comprising a third die assembly as defined in (a), wherein a central portion of the nozzle of the third die assembly is co-axially located within the inner mandrel of the second die assembly.

31. The extrusion die of claim 26, further comprising a vacuum cooling mandrel disposed downstream from said first and second die assemblies, said vacuum cooling mandrel comprising a single cooling channel and multiple vacuum ports, said multiple vacuum ports disposed along an outer surface of the cooling mandrel.

32. The extrusion die of claim 31, wherein said vacuum ports further comprise vacuum port holes for independent regulation of vacuum pressure within each vacuum port.

33. A method for preparing a multi-layered pipe using the extrusion die of claim 1, wherein said method includes the steps of:
   (a) introducing under pressure a first extrudate into the lateral opening of the first die assembly and introducing a second extrudate into the lateral opening of the second die assembly;
   (b) passing said first and second extrudates through said first and second layer-forming channels; and,
   (c) receiving said first extrudate from the die gap of the first die assembly and receiving the second extrudate from the die gap of the second die assembly.

34. The method of claim 33, wherein the first extrudate has a different temperature profile than the second extrudate.

35. The method of claim 33, further comprising the step of adjusting the longitudinal distance between the die gap of the first die assembly and the die gap of the second die assembly by moving the second die assembly longitudinally within the inner mandrel of the first die assembly.

36. The method of claim 33, further comprising the step of introducing air pressure into the air space.

37. The method of claim 33, wherein the extrusion die further comprises means near the extrusion head for moving the inner die lip longitudinally, said method comprising the additional step of altering the size of the die gap by using said means.

38. The method of claim 33, wherein the extrusion die further comprises a vacuum cooling mandrel disposed in a location downstream from said first and second die assemblies, said vacuum cooling mandrel comprising a single cooling channel and multiple vacuum ports, said multiple vacuum ports disposed along an outer surface of the cooling mandrel.

39. The method of claim 38, further comprising the step of shaping the second extrudate using the vacuum cooling mandrel.

40. The method of claim 39, further comprising the step of introducing a vacuum through said vacuum ports.

41. A method for preparing a multi-layered pipe using the extrusion die of claim 26, wherein said method includes the steps of:
   (a) introducing under pressure a first extrudate into the lateral opening of the first die assembly and introducing a second extrudate into the lateral opening of the second die assembly;
   (b) passing said first and second extrudates through said first and second layer-forming channels; and,
   (c) receiving said first extrudate from the die gap of the first die assembly and receiving the second extrudate from the die gap of the second die assembly.

42. The method of claim 41, wherein the first extrudate has a different temperature profile than the second extrudate.

43. The method of claim 41, further comprising the step of adjusting the longitudinal distance between the die gap of the first die assembly and the die gap of the second die assembly by moving the second die assembly longitudinally within the inner mandrel of the first die assembly.

44. The method of claim 41, wherein the extrusion die further comprises means near the extrusion head for moving the inner die lip longitudinally, said method comprising the additional step of altering the size of the die gap by using said means.

45. The method of claim 41, wherein the extrusion die further comprises a vacuum cooling mandrel disposed in a location downstream from said first and second die assemblies, said vacuum cooling mandrel comprising a single cooling channel and multiple vacuum ports, said multiple vacuum ports disposed along an outer surface of the cooling mandrel.

46. The method of claim 45, further comprising the step of shaping the second extrudate using the vacuum cooling mandrel.

47. The method of claim 46, further comprising the step of introducing a vacuum through said vacuum ports.

48. An extrusion die for use in an apparatus to produce multi-layered pipes, the extrusion die comprising:
   (a) a first and second die assembly, each die assembly comprising:
      (i) an extrusion head having a central bore and a lateral opening for receiving an extrudate;
      (ii) a nozzle, operably connected to the extrusion head, the nozzle having an outer die lip at a free end of the nozzle;
      (iii) a hollow mandrel coaxially located in the central bore,
      (iv) an inner mandrel coaxially located in the hollow mandrel and in the nozzle, the inner mandrel having an inner die lip at a free end of the inner mandrel; the inner die lip and outer die lip defining a die gap; and
      (v) the nozzle and inner mandrel defining a layer-forming channel in fluid communication with the lateral opening and the die gap;
   wherein a central portion of the nozzle of the second die assembly is co-axially located within the inner mandrel of the first die assembly such that the nozzle of the second die assembly and the inner mandrel of the first die assembly define an air space; and,
   wherein the air space allows a first extrudate in the layer-forming channel of the first die assembly to be at a temperature different than a second extrudate in the layer-forming channel of the second die assembly.

49. The extrusion die of claim 48 further comprising means for moving the second die assembly longitudinally within the inner mandrel of the first die assembly, thereby altering a longitudinal distance between the die gap of the first die assembly and the die gap of the second die assembly.

50. The extrusion die of claim 48 further comprising means near the extrusion head for moving the inner die lip longitudinally, thereby altering the size of the die gap.

51. An extrusion die for use in an apparatus to produce multi-layered pipes, the extrusion die comprising:
   (a) a first and second die assembly, each die assembly comprising:
      (i) an extrusion head having a central bore and a lateral opening for receiving an extrudate;
      (ii) a nozzle operably connected to the extrusion head, the nozzle having an outer die lip at a free end of the nozzle;

(iii) a hollow mandrel coaxially located in the central bore,
(iv) an inner mandrel coaxially located in the hollow mandrel and in the nozzle, the inner mandrel having an inner die lip at a free end of the inner mandrel; the inner and outer die lips defining a die gap; and
(v) the nozzle and inner mandrel defining a layer-forming channel in fluid communication with the lateral opening and the die gap;

wherein a central portion of the nozzle of the second die assembly is co-axially located within the inner mandrel of the first die assembly, and wherein a first extrudate in the layer-forming channel of the first die assembly is at a temperature different than a second extrudate in the layer-forming channel of the second die assembly.

* * * * *